Feb. 8, 1966 H. N. ESTERLY ETAL 3,233,809
GUIDE ASSEMBLY
Filed June 24, 1963 2 Sheets-Sheet 1

HENRY N. ESTERLY
JOHN D. SPERRY
INVENTORS

BY Robert H. Clay

ATTORNEY

Feb. 8, 1966    H. N. ESTERLY ETAL    3,233,809
GUIDE ASSEMBLY
Filed June 24, 1963    2 Sheets-Sheet 2
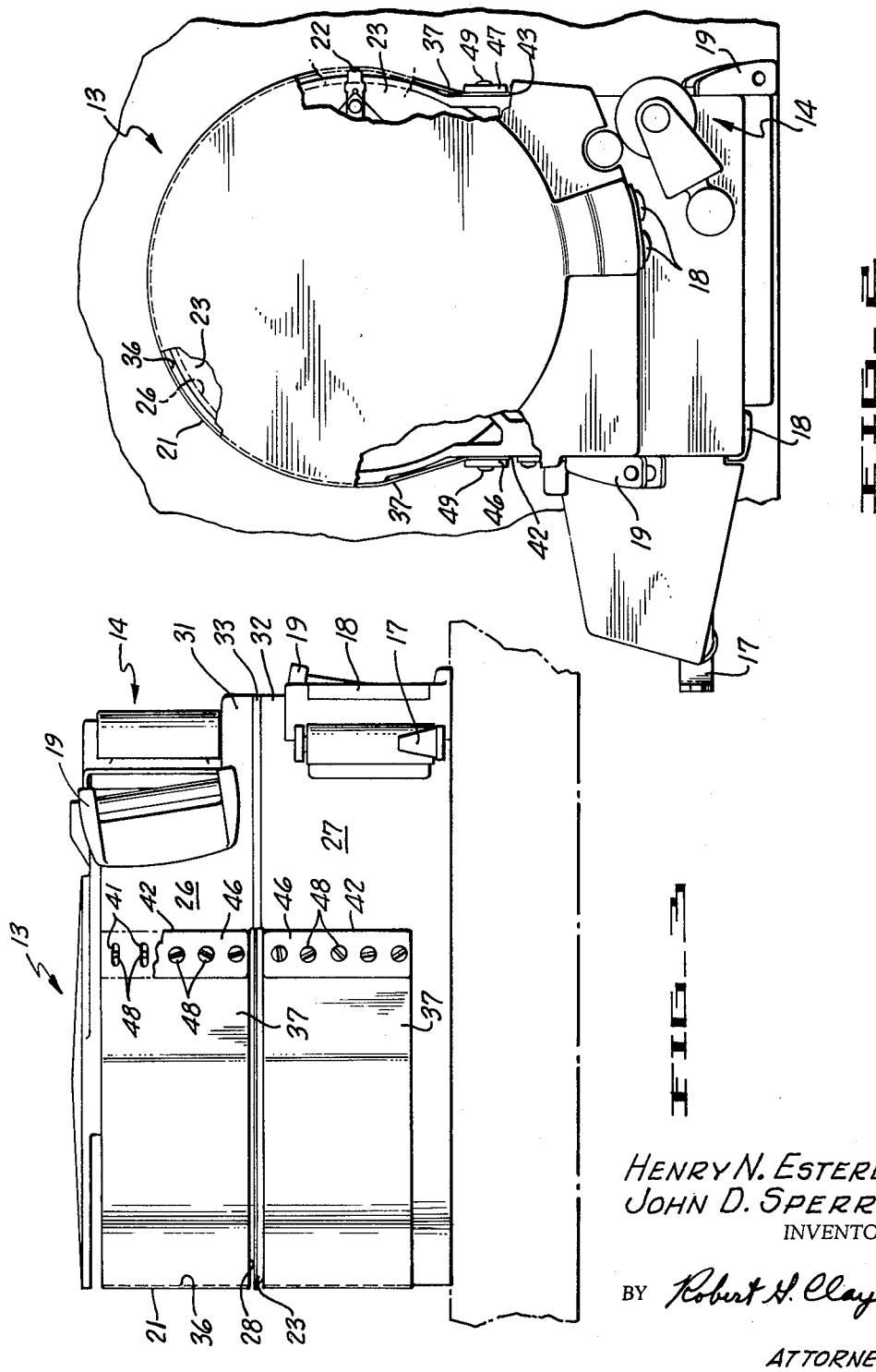
HENRY N. ESTERLY &
JOHN D. SPERRY
INVENTORS
BY Robert H. Clay
ATTORNEY United States Patent Office 3,233,809
Patented Feb. 8, 1966

3,233,809
GUIDE ASSEMBLY
Henry N. Esterly, Cupertino, and John D. Sperry, Los Altos, Calif., assignors to Ampex Corporation, Redwood City, Calif., a corporation of California
Filed June 24, 1963, Ser. No. 290,141
9 Claims. (Cl. 226—197)

This invention relates to guides, and particularly to tape guides conforming to a predetermined surface.

Previously in the art, broad band magnetic tape transports have often employed two-headed helical scan configurations, requiring massive rotary head scanning assemblies. Such an assembly generally includes an upper and a lower half spaced apart to define a gap for rotation of the transducing heads, and the two halves together define a substantially 180-degree semi-cylindrical surface for guiding the tape in a helical half-turn around the gap. The guide surface defined cannot by ordinary construction be a full 360 degrees, because the two guide halves must be secured together somewhere outside the radius of movement of the rotating heads. The 180-degree surface of each guide half is therefore caused to terminate in a radial extension by which the two halves are coupled.

It will be readily understood that the radial dimension of the semi-cylindrical guide surface must be precisely established, in order that the tape be guided with the same head-to-tape pressure at all points where it engages the rotating heads. Likewise the finish of the surface must be quite smooth, to decrease frictional drag and wear of the tape.

Previously, a method for constructing the guide assembly involved painstakingly milling each part to produce the semi-cylindrical guide surface, because of course lathe turning is not possible; and the surface thereafter had to be ground by equally painstaking means to produce the required surface finish. In fact, two separate grinding steps were needed because the guide was made of aluminium, Sanforized to produce a hard surface to a maximum possible depth of about .001 inch. The milling step could not be depended on to produce a surface everywhere within .001 inch of the final desired surface. The milled surface therefore had to be rough ground to this tolerance before Sanforizing, and more finely ground after Sanforizing. Otherwise the final grinding step might have had to remove more than .001 inch to reach the predetermined surface, and the hardened portion would have been entirely cut away.

Another method was to spray the milled surface with stainless steel in "plasm" form. But this method also required a final grinding step, and the steel surface was not as hard as was desired.

Furthermore, it was found that the smooth ground surface eventually produced by either method presents more sharply-pointed projections than does a surface of the same R.M.S. finish produced by other methods (e.g., rolling) and therefore may cause more damage to the tape.

Accordingly it is an object of the present invention to produce an assembly conforming to a predetermined surface, the assembly being capable of manufacture by simpler and less expensive steps.

Another object of the invention is to produce an assembly as above described and presenting a finished surface causing less damage to a tape frictionally engaged with and moving thereover.

A further object of the invention is to produce an assembly as above described and capable of manufacture without a grinding step.

An apparatus constructed in accordance with the invention includes a support member that is milled to present a semi-cylindrical surface substantially smaller in radius than the final desired surface, and a sheet of hardened and roll-finished material attached to the semi-cylindrical surface of the support member. Since roll-finished steel comes in a variety of thicknesses, the milling operation can be performed to wide tolerances, and quite inexpensively. It is only necessary to determine the precise radius obtained after the milling operation, and to select a roll-finished sheet of precisely the correct thickness to build the assembly up to the desired surface. Furthermore the rolled surface is far less jagged than a ground surface even when both have the same R.M.S. finish, and causes less damage to the tape. With this structure, a grinding step is entirely eliminated and a superior surface is produced.

A better understanding of the invention may be had by reference to the following description, taken in conjunction with the accompanying drawings, in which:

FIGURE 2 is a fragmentary plan of a portion of the apparatus shown in FIGURE 1; and FIGURE 3 is a fragmentary elevation of the apparatus shown in FIGURE 2.

Figure 1:
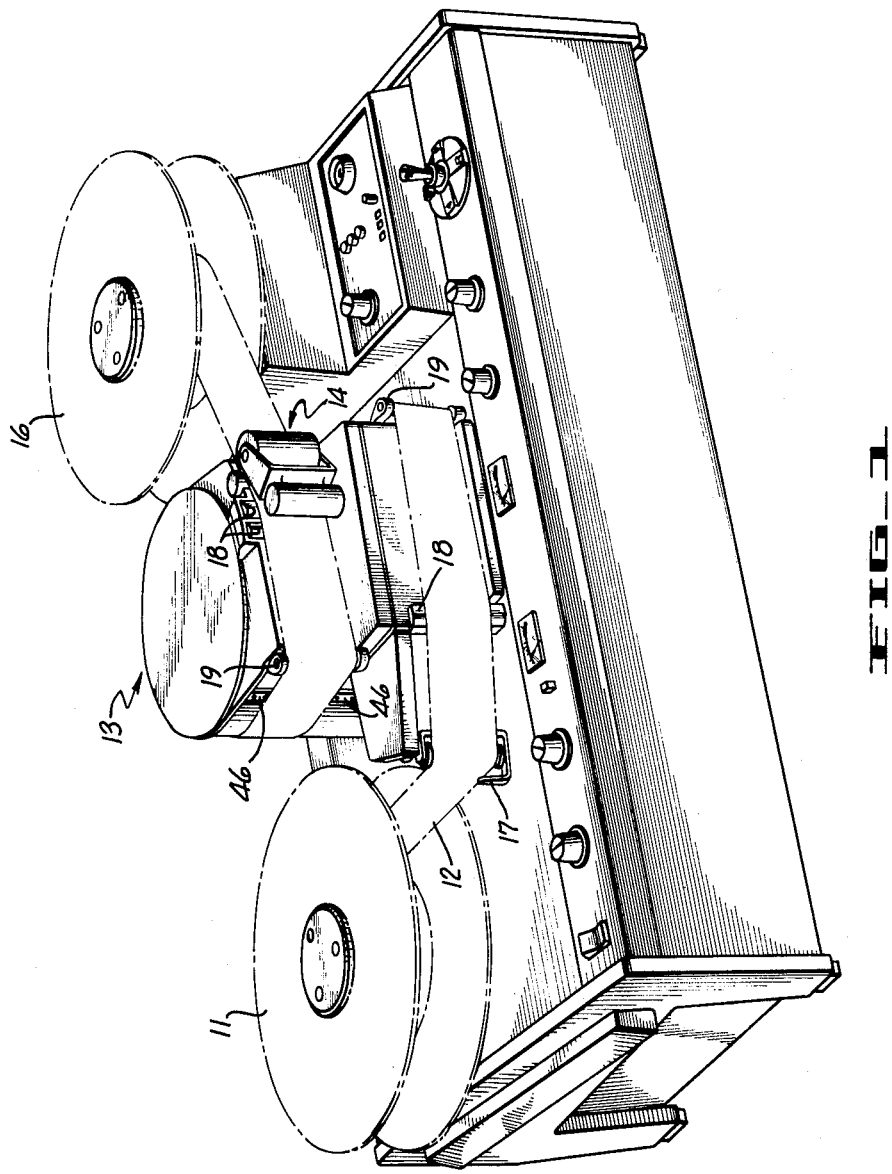
FIGURE 1 is a perspective of a tape transport incorporating the invention.

Referring now to the drawings and particularly to FIGURE 1, there is shown a broad band magnetic tape transport including a supply reel 11, a tape 12, a rotating head scanning assembly 13, around which the tape is wrapped in a 180-degree helical turn, a capstan and a pinch roller assembly 14, and a takeup reel 16. A number of other items, including a tension sensing arm 17, transducing heads 18, and tape guides 19 are mounted on the massive scanning assembly 13.

Referring now to FIGURE 2 the scanning assembly is shown as presenting a semi-cylindrical surface 21 of substantially 180 degrees and somewhat more in extent, which guides the tape in its helical half turn, so that the tape remains in precise registration with the rotating heads, one of which is shown as head 22 mounted on a rotating head drum 23. In FIGURE 3 is shown how the scanning assembly is divided into a pair of upper and lower support members 26 and 27, with the rotating head drum 23 mounted for rotation in a gap 28 between the support members 26 and 27. For support of the upper member 26, both of the members have radially extending portions 31 and 32 respectively, by which they are coupled solidly together, preferably with a spacing element 33 imposed between.

As mentioned above, the scanning assembly presents a semi-cylindrical surface 21 that must be very precisely formed in order to hold the tape at the correct radius for engagement with the rotating head 22. As an important feature of the invention, the support members 26 and 27 are not formed to conform directly to the surface 21, but are formed with a milled surface 36 that is of substantially smaller radius than the surface 21 and is uniformly spaced therefrom. Fitted tightly against the surface 36, is a piece of sheet material 37 having a uniform thickness precisely equal to the spacing between the support member 36 and the surface 21. It follows that the outward surface of the sheet material 37 conforms precisely to the predetermined surface 21 and is suitable for guiding the tape at the precise radius intended.

An important advantage of the structure above described is that it requires only a comparatively inexpensive milling operation to wide radial tolerances, and then the selection and application of sheet material 37 having the precise thickness needed to fill out the difference between the milled surface 36 and the final surface 21. In other words, the spacing of the surface 36 from the predetermined surface 21 may be by any dimension that falls within a predetermined range. Thus one surface 36 on one product might be at a substantially different radius than the same surface 36 on another product, the thicknesses of the respective sheet material elements 37 being compensatingly different but the surface 21 of each product being precisely at the same radius. On the other hand, any other known method for producing the surface 21 on the member 36 requires not only a milling step performed to exacting tolerances, but also at least one and perhaps two grinding steps, which are entirely avoided when the above described structure is used.

As another important feature of the invention, the roll-finished material 37 produces a very much less damaging surface 21 engaging the tape even though it may have the same measurable rms finish as that produced by a grinding operation. This is because the rolling process smoothly compresses the material of the surface, whereas the grinding process cuts away and tears at the surfaces leaving many jagged points and edges.

In a preferred example, the material of the members 26 and 27 is aluminum, chosen partly for its non-magnetic properties, while the material of the sheet material 37 is hardened rolled stainless steel, which is also non-magnetic. The use of this material also avoids the necessity for hardening or sanfordizing the aluminum of the members 26 and 27.

Referring to FIGURE 3, the structure for mounting the sheet material 37 on the support members 26 and 27 is shown. The sheet elements 37 are first formed as rectangular sheets and are provided with elongated openings 41 adjacent to opposite parallel edges 42 and 43 (FIGURE 2), with the openings 41 elongated in a direction perpendicular to the edges 42 and 43 so that when the sheets are bent to conform to the semi-cylindrical surface 36 of the scanning assembly, with the edges 42 and 43 generally parallel to the axis of surface 21, the openings 41 will be elongated in a circumferential direction. Adjacent the edges 42 and 43 of each sheet 37 are superimposed a pair of clamping plates 46 and 47, each with a plurality of circular openings 48 registering with the corresponding elongated openings 41 of the sheet. The sheets 37 are then clamped in circumferentially tensioned condition to the scanning assembly as by means of a plurality of bolts 49 threaded through the openings 41 and 48 and into the expanding portions 31 and 32 of the support members 26 and 27. The tensioning may be accomplished either before or after the tightening of the bolts. If before, a tensioning jig may be used; or if after, the procedure is to cool the assembly to approximately zero degrees Fahrenheit before tightening the bolts, and then to permit the assembly to warm up to a normal range of ambient temperature to induce differential expansion of the support member 26 relative to the sheet 37. In preparation for this method it is necessary to provide a sheet 37 having a lower coefficient of thermal expansion than the material of the support member; and the previously mentioned construction of the support member from aluminum and the sheet 37 from stainless steel is a suitable example.

Thus there has been described an apparatus constructed in accordance with the invention including a support member that is milled to present a semi-cylindrical surface substantially smaller in radius than the final desired surface, and a sheet of hardened and roll-finished material attached to the semi-cylindrical surface of the support member. Since roll-finished steel comes in a variety of thicknesses, the milling operation can be performed to wide tolerances, and quite inexpensively. It is only necessary to determine the precise radius obtained after the milling operation, and to select a roll-finished sheet of precisely the correct thickness to build the assembly up to the desired surface. Furthermore the rolled surface is far less jagged than a ground surface even when both have the same rms finish, and causes less damage to the tape. With this structure, a grinding step is entirely eliminated and a superior surface is produced.

What is claimed is:

1. An assembly for guiding tape on a predetermined path, comprising:
   a support member having a face normal to the thickness of said tape on said path and extending throughout a predetermined segment of the length of said path, said face being, in the direction of said thickness, permanently and uniformly spaced from said path; and
   a piece of sheet material having a permanent and uniform thickness precisely equal to the spacing between said support member face and said path;
   said sheet material being mounted on said member and in uniform contact with said face thereof.

2. An assembly for guiding tape on a predetermined path, comprising:
   a support member having a rough-cut face normal to the thickness of said tape on said path and extending throughout a predetermined segment of the length of said path, said rough-cut face being, in the direction of said thickness, permanently and uniformly spaced from said path by any dimension that falls within a predetermined range; and
   a piece of sheet material having finished faces and a permanent and uniform thickness precisely equal to said spacing dimension between said support member face and said path;
   said sheet material being mounted on said member and in uniform contact with said rough-cut face thereof.

3. An assembly for guiding tape on a predetermined path, comprising:
   a support member presenting a milled face normal to the thickness of said tape on said path and extending throughout a predetermined segment of the length of said path, said milled face being, in the direction of said thickness, permanently and uniformly spaced from said path by any dimension that falls within a predetermined range; and
   a piece of sheet material having roll finished faces and a permanent and uniform thickness precisely equal to said spacing dimension between said milled face and said path;
   said sheet material being mounted on said member and in uniform contact with said milled face thereof.

4. In a helical-scan broadband magnetic tape transport, a guide assembly for guiding said tape in a helical path, comprising:
   a support member having a right cylindrical milled face that is coaxial with and of smaller diameter than the cylindrical surface of said helical path and is permanently and uniformly spaced from said surface by any radial dimension that falls within a predetermined range; and
   a piece of sheet material having roll finished faces and a permanent and uniform thickness precisely equal to the spacing between said support member and said surface;
   said sheet material being mounted on said member and in uniform contact with said milled face thereof.

5. In a helical-scan broadband magnetic tape transport, a guide assembly for guiding said tape in a helical path, comprising:

a support member having a right cylindrical milled face that is coaxial with and of smaller diameter than the cylindrical surface of said helical path and is permanently and uniformly spaced from said surface by any radial dimension that falls within a predetermined range; and a piece of sheet material having roll finished faces and a permanent and uniform thickness precisely equal to the spacing between said support member and said surface;

said sheet material being mounted on said member in circumferentially tensioned condition and in uniform contact with said milled face thereof.

6. In a helical-scan broadband magnetic tape transport, a guide assembly for guiding said tape in a helical path, comprising:

a support member having a right cylindrical milled face that is of smaller diameter than the cylindrical surface of said helical path and is uniformly spaced from said surface by any radical dimension that falls within a predetermined range;

a piece of sheet material having roll finished faces and a uniform thickness precisely equal to the spacing between said support member and said surface;

said sheet material being mounted on said member in circumferentially tensioned condition and in uniform contact with said milled face thereof, with a pair of edges of said sheet material generally parallel to the axis of said member;

said sheet material having a plurality of openings adjacent said edges, said openings being elongated in a circumferential direction;

a pair of clamping plates superimposed on said sheet material adjacent said edges, said plates being provided with circular openings registering with said elongated openings; and a plurality of bolts threaded through said openings in said plates and sheet material and into said member;

whereby said plates are urged into clamping relationship with said sheet material and clamp said sheet material in said tensioned condition thereof.

7. In a helical-scan broadband magnetic tape transport, a guide assembly for guiding said tape in a helical path, comprising:

a support member having a right cylindrical milled face that is of smaller diameter than the cylindrical surface of said helical path and is uniformly spaced from said surface by any radial dimension that falls within a predetermined range;

said right cylindrical milled face extending for substantially more than 180 degrees and terminating in a radially extending portion of said member;

a piece of sheet material having roll finished faces and a uniform thickness precisely equal to the spacing between said support member and said surface;

said sheet material being mounted on said member in circumferentially tensioned condition and in uniform contact with said milled face thereof, with a pair of edges of said sheet material generally parallel to the axis of said member and engaging said extending portion thereof;

said sheet material having a plurality of openings adjacent said edges, said openings being elongated in a circumferential direction;

a pair of clamping plates superimposed on said sheet material adjacent said edges, said plates being provided with circular openings registering with said elongated openings; and a plurality of bolts threaded through said openings in said plates and sheet material and into said extending portion of said member;

whereby said plates are urged into clamping relationship with said sheet material and clamp said sheet material in said tensioned condition thereof.

8. In a helical-scan broadband magnetic tape transport, a guide assembly for guiding said tape in a helical path, comprising:

a pair of support members each having a right cylindrical milled face that is of smaller diameter than the cylindrical surface of said helical path and is uniformly spaced from said surface by any radial dimension that falls within a predetermined range;

each of said right cylindrical milled faces extending for substantially more than 180 degrees and terminating in a radially extending portion of the corresponding member;

said members being mounted in axially aligned relation with said extending portions thereof solidly coupled together and the right cylindrical portions thereof axially spaced apart to define a gap for rotation of a pair of rotating transducing heads;

a pair of sheet material elements each having roll finished faces and a uniform thickness precisely equal to the spacing between said support members and said surface;

said sheet material elements each being mounted on one of said members in circumferentially tensioned condition an in uniform contact with the corresponding milled face thereof, with a pair of edges of each sheet material element generally parallel to the axis of said corresponding member and engaging said extending portion thereof;

said sheet material elements each having a plurality of openings adjacent said edges thereof, said openings being elongated in a circumferential direction;

a pair of clamping plates superimposed on each of said sheet material elements adjacent said edges thereof, said plates being provided with circular openings registering with said elongated openings; and a plurality of bolts threaded through said openings in said plates and sheet material elements and into said extending portions of said members;

whereby said plates are urged into clamping relationship with said sheet material elements and clamp said sheet material elements in said tensioned condition thereof.

9. In a helical-scan broadband magnetic tape transport, a guide assembly for guiding said tape in a helical path, comprising:

a pair of support members each having a right cylindrical milled face that is of smaller diameter than the cylindrical surface of said helical path and is uniformly spaced from said surface by any radial dimension that falls within a predetermined range;

each of said right cylindrical milled faces extending for substantially more than 180 degrees and terminating in a radially extending portion of the corresponding member;

said members being mounted in axially aligned relation with said extending portions thereof solidly coupled together and the right cylindrical portions thereof axially spaced apart to define a gap for rotation of a pair of rotating transducing heads;

a pair of sheet material elements each having roll finished faces and a uniform thickness precisely equal to the spacing between said support members and said surface;

said sheet material elements being made of material having a lower coefficient of thermal expansion than the material of said support members;

said sheet material elements each being mounted on one of said members in circumferentially tensioned condition and in uniform contact with the corresponding milled face thereof, with a pair of edges of each sheet material element generally parallel to the axis of said corresponding member and engaging said extending portion thereof;

said sheet material elements each having a plurality of openings adjacent said edges thereof, said openings being elongated in a circumferential direction;

a pair of clamping plates superimposed on each of said sheet material elements adjacent said edges thereof, said plates being provided with circular openings registering with said elongated openings; and a plurality of bolts threaded through said openings in said plates and sheet material elements and into said extending portions of said members;

whereby said plates are urged into clamping relationship with said sheet material elements and clamp said sheet material elements in said tensioned condition thereof.

References Cited by the Examiner

UNITED STATES PATENTS

| | | | |
|---|---|---|---|
| 1,955,713 | 4/1934 | Tomlin | 226—191 |
| 2,521,951 | 9/1950 | Schubert | 271—51 X |
| 3,062,922 | 11/1962 | Beckner et al. | |
| 3,087,665 | 4/1963 | Thomas | 226—190 |

M. HENSON WOOD, JR., *Primary Examiner.*

RAPHAEL M. LUPO, ROBERT B. REEVES, *Examiners.*